(12) United States Patent
Nordstrom et al.

(10) Patent No.: US 9,168,835 B2
(45) Date of Patent: Oct. 27, 2015

(54) SYSTEMS AND METHODS FOR AUXILIARY POWER OUTLET CONTROL

(71) Applicant: GM GLOBAL TECHNOLOGY OPERATIONS LLC, Detroit, MI (US)

(72) Inventors: Erik C. Nordstrom, Troy, MI (US);
Jeffrey J. Hoorn, Northville, MI (US);
Stephen M. Cichy, Lapeer, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 14/091,580

(22) Filed: Nov. 27, 2013

(65) Prior Publication Data

US 2015/0149034 A1     May 28, 2015

(51) Int. Cl.
| | |
|---|---|
| *G06F 7/00* | (2006.01) |
| *B60L 1/00* | (2006.01) |
| *H02J 7/00* | (2006.01) |
| *H01M 2/02* | (2006.01) |
| *H02J 9/02* | (2006.01) |

(52) U.S. Cl.
CPC ............... *B60L 1/006* (2013.01); *H02J 7/007* (2013.01); *H02J 7/0052* (2013.01); *H01M 2/026* (2013.01); *H02J 9/02* (2013.01)

(58) Field of Classification Search
CPC ..... H01M 2/026; H02J 9/02; H02J 2009/068; H02J 7/0052; H02J 7/007
USPC .................. 701/22, 36; 180/68.5, 65.29, 54.1
See application file for complete search history.

(56) References Cited

U.S. PATENT DOCUMENTS

| | | | | |
|---|---|---|---|---|
| 6,140,956 | A * | 10/2000 | Hillman et al. | 342/357.31 |
| 7,593,711 | B2 * | 9/2009 | Romano et al. | 455/343.5 |

* cited by examiner

*Primary Examiner* — Gertrude Arthur Jeanglaude
(74) *Attorney, Agent, or Firm* — Ingrassia Fisher & Lorenz, P.C.

(57) ABSTRACT

Methods, systems are provided for controlling an auxiliary power outlet in a vehicle. The method includes connecting the battery powered device to the accessory power outlet, synchronizing communications between the battery powered device to a computing device of the vehicle, and determining when the battery powered device is connected to an electric bus and is charging. When the battery powered device is either not connected to the electric bus or the battery powered device is not charging, then disconnecting power from the accessory power outlet. The system includes a battery, an electrical bus electrically connected to the battery, at least one auxiliary power outlet in electrical communication with the battery and configured to mate with a battery charging port of a battery operated device; and an electronic control unit (ECU). The ECU is configured to disconnect power from the accessory power outlet when the battery is charged.

20 Claims, 2 Drawing Sheets

SYSTEMS AND METHODS FOR AUXILIARY POWER OUTLET CONTROL

TECHNICAL FIELD

The technical field generally relates to vehicle electrical systems, and more particularly relates to methods to control power to one or more auxiliary power outlets in a vehicle.

BACKGROUND

The amount of the electrical load on a vehicle is growing and is ever more complex. When all systems are in operation concurrently, a vehicle may consume upwards of 300 amps. Not only is the amount of the electrical load growing, but the sophistication of the load is also growing with more and more processors and other electronic features and equipment being added.

As more features are added to a vehicle, power management with a goal to conserve the power in the vehicle battery is growing more important. Typically alternators generate up to 185 amps. However, transient current of about 350 amps may be experienced due the use of features such as power steering, heated seats and the use of hybrid systems. Steady state current in a vehicle is approximately 77 amps. Off power mode vehicle current may drop to as low as 20 mA.

One ubiquitous exemplary electronic device that commonly uses the vehicle battery via an auxiliary power outlet is the cell phone. Cell phones may draw approximately one Amp (e.g., 750 mA) during full charging mode. Left on for a long enough period of time, a cell phone can drain a vehicle battery. Other portable electronic devices can do likewise.

Accordingly, it is desirable to preserve a vehicle battery by reducing power consumption by rechargeable devices. Furthermore, other desirable features and characteristics of the present invention will become apparent from the subsequent detailed description and the appended claims, taken in conjunction with the accompanying drawings and the foregoing technical field and background.

SUMMARY

A method for controlling an accessory power outlet (APO) in a vehicle while charging a battery powered device is provided. The method comprises connecting the battery powered device to the accessory power outlet, synchronizing communications between the battery powered device to a computing device of the vehicle, and determining when the battery powered device is connected to an electric bus and is charging. When the battery powered device is either not connected to the electric bus or the battery powered device is not charging, then disconnecting power from the accessory power outlet.

A system for controlling an accessory power outlet (APO) in a vehicle while charging a battery powered device. The system comprises a battery, an electrical bus electrically connected to the battery, at least one auxiliary power outlet in electrical communication with the battery and configured to mate with a battery charging port of a battery operated device; and an electronic control unit (ECU). The ECU is configured to synchronize communications between the battery powered device and the ECU; and, to determine when the battery powered device is connected to the electric bus and is charging. When the battery powered device is either not connected to the electric bus or the battery powered device is not charging then power is disconnected from the accessory power outlet.

A vehicle is provided for. The vehicle is comprised of a battery, an electrical bus electrically connected to the battery, at least one auxiliary power outlet in electrical communication with the battery via the electrical bus and configured to mate with a battery charging port of a battery powered device. The vehicle is further comprises an electronic control unit (ECU). The ECU is configured to synchronize communications between the battery powered device and the ECU and to determine when the battery powered device is connected to the electric bus and is charging. When the battery powered device is either not connected to the electric bus, or the battery powered device is not charging, then the accessory power outlet is deenergized.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
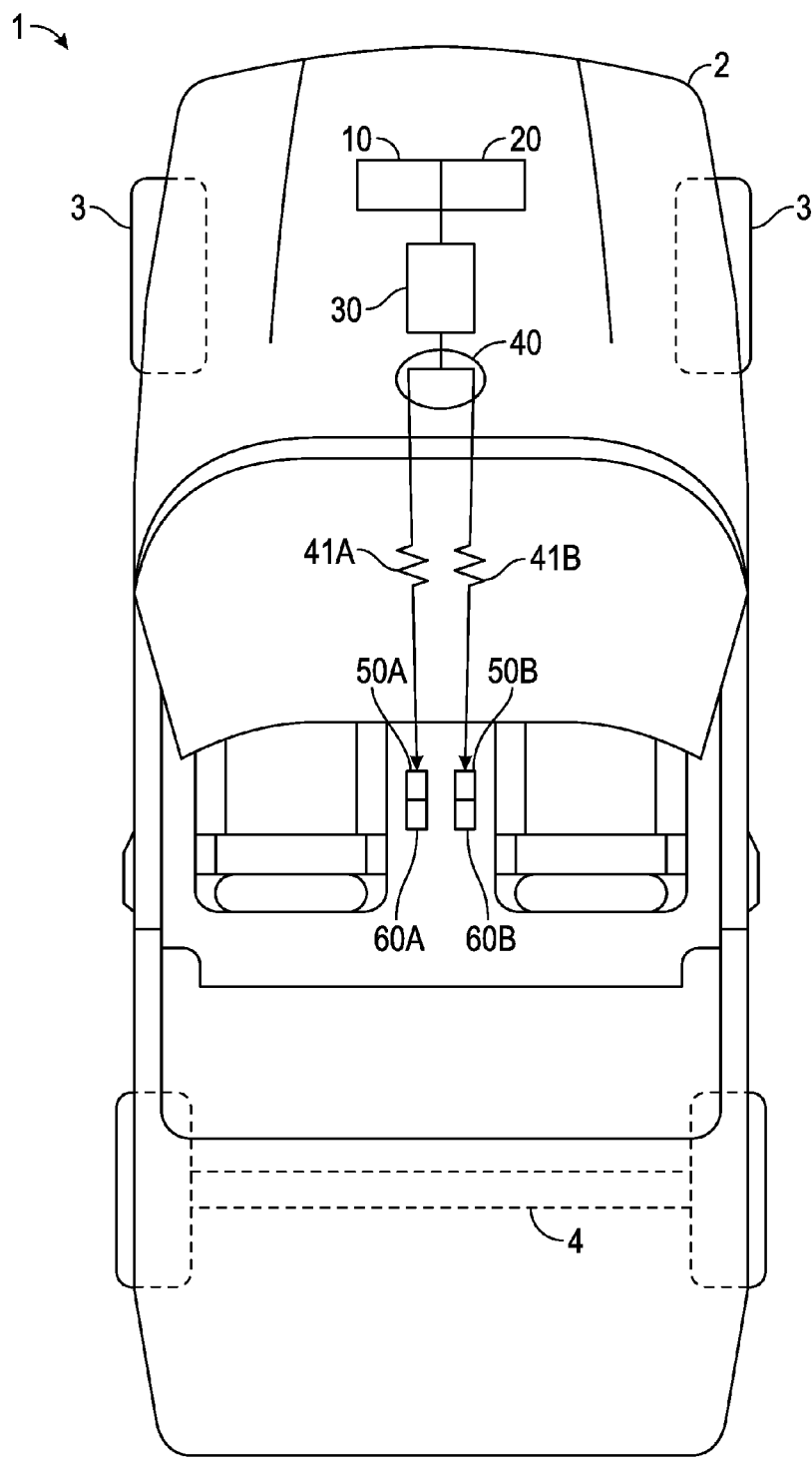
FIG. 1 is a simplified vehicle in accordance with an embodiment.

The following detailed description is merely exemplary in nature and is not intended to limit the application and uses. Furthermore, there is no intention to be bound by any expressed or implied theory presented in the preceding technical field, background, brief summary or the following detailed description.

Those of skill in the art will appreciate that the various illustrative logical blocks, modules, circuits, and algorithm steps described in connection with the embodiments disclosed herein may be implemented as electronic hardware, computer software executing on a processor, or combinations of both. Some of the embodiments and implementations are described above in terms of functional and/or logical block components (or modules) and various processing steps. However, it should be appreciated that such block components (or modules) may be realized by any number of hardware, software executing on a processor, and/or firmware components configured to perform the specified functions.

To clearly illustrate this interchangeability, various illustrative components, blocks, modules, circuits, and steps may be described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with an electronic control unit (ECU) in the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

FIG. 1 is a simplified diagram of a vehicle 1 illustrating an exemplary embodiment of the subject matter disclosed herein. Among other components, the vehicle comprises wheels 3, drive train 4 and a body 2. The vehicle 1 further comprises a battery 30. Battery 30 may be a battery of any size and voltage required for the proper operation of the vehicle 1. As non-limiting examples, the battery 30 may provide a potential of 12 volts, 110 volts or 220 volts.

The power from the battery 30 may is distributed via a direct current (DC) bus 40. The illustrated DC bus 40 is simplified for the sake of clarity and brevity. The DC bus 40 may be a single conducting element such as a wire or may comprise a more complex circuit with distribution lines such as exemplary distribution lines 40A and 40B. The various distribution lines of the DC bus 40 may supply any number of DC loads in the vehicle such as the electronic control unit (ECU) 20, a wireless transceiver 10 and the auxiliary power outlets (APO) 50A and 50B.

The DC bus 40 may also include ancillary circuitry to step up or step down voltages in any part of the DC bus 40. For example, distribution line 40A may include one or more DC-DC converters as are well known in that art to step down a 110 volt potential to a 6 volt potential. The DC bus 40 may also have ancillary circuitry as ay be well known in the art to transmit digital data through the DC bus to the ECU 20 or other equivalent computing device in the vehicle.

The APOs (50A/50B) may include one or more physical sockets configured to accept one or more fittings (e.g., a plug) comprised on an electronic device 60 or on a charging cable for an electronic device that is configured to charge the battery (not shown) of the electronic device. Non-limiting examples of an electronic device include a cell phone, a computing device, a music storage device and a gaming device. Further, non-limiting examples of plugs/ports include a USB port, a conventional cigarette lighter port, cylindrical plugs, one pin plugs, multi-pin plugs, molex connectors, Tamiya connectors, Empower plugs, Deans connectors, SAE connectors, ISO 4165 connectors and cell phone connectors of all types.

In embodiments herein, the electronic device(s) 60 include a means for wired and/or wireless communication with the wireless transceiver 10. Means for wired and wireless communications within a vehicle are manifold and well known in the art. Thus, the myriad forms of wired and wireless communications will not be discussed further herein in the interest of clarity and brevity other to say that communications protocols for such communications may be Ethernet, Zigbee™, Bluetooth™, Wifi and any other protocol that may be developed in the future under IEEE standards 802.15, 802.11, or under any follow-on wired or wireless IEEE standards that may be developed in the future.

Figure 2:
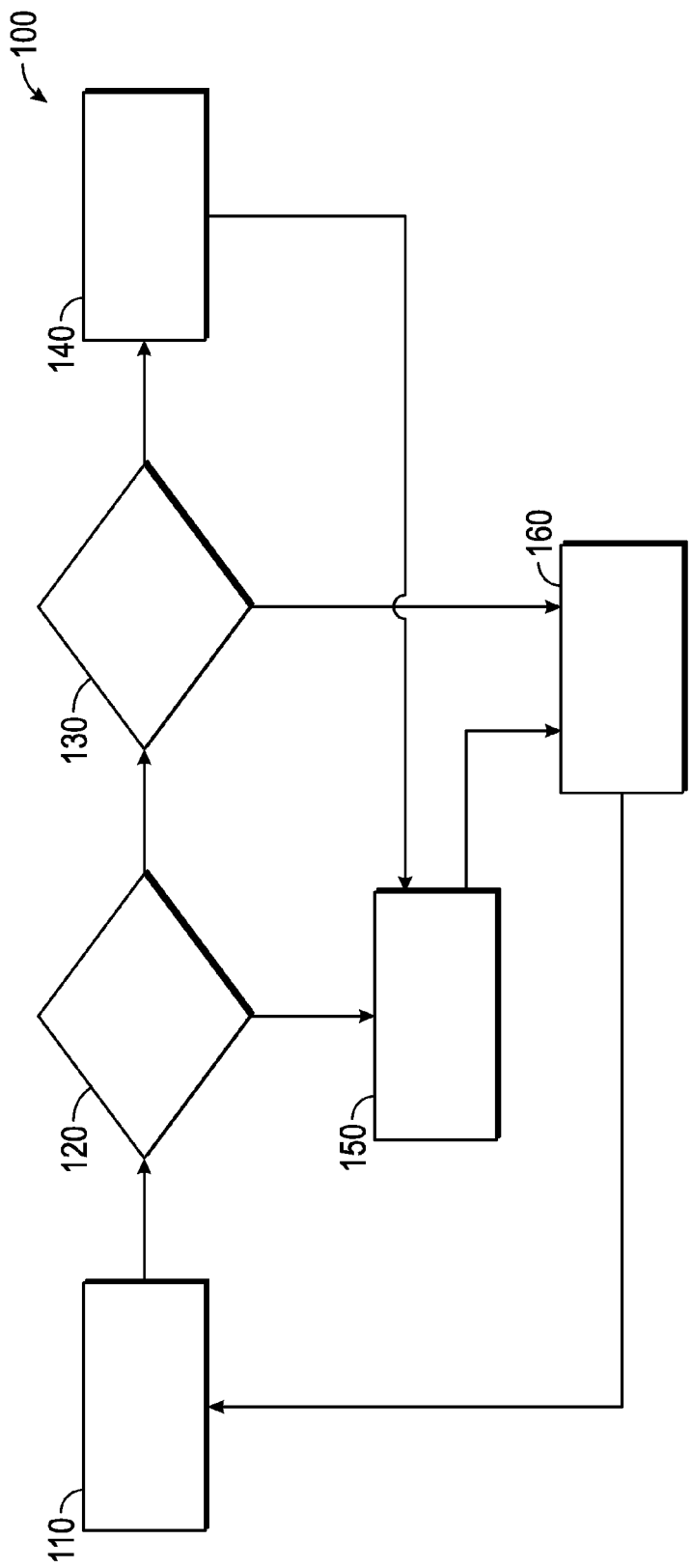
FIG. 2 is a simplified logic flow diagram of a method for controlling an auxiliary power outlet (APO) in a vehicle.

FIG. 2 is a logic flow diagram of a method 100 for controlling power to APOs in a vehicle. For simplicity, and by way of example only, the following discussion will focus on the charging of cell phones. However, Applicants do not intend the subject matter herein to be so limited. The following may apply to any electric/electronic devices that require a battery charge. Non-limiting examples include Ipods™, Ipads™, laptop computers, electronic tablets, pagers, Blackberrys™, portable radios, electronic book readers (i.e., a Nook™), etc.

At process 110, a cell phone is, or has been, wirelessly synchronized to a computing device within the vehicle 1 and is physically connected to an auxiliary power outlet 50A/B for recharging. Synchronization occurs when a mobile device communicates with applications on a computing device or a server. This is often referred to simply as a "sync" or a "docking " Mobile devices must have some way of loading applications, updates, and changes to their operating systems or settings. Even devices capable of wireless networking must have some way of loading software, if only to load what is needed to create the wireless connection in the first place. You can do this by synchronizing the device's operating system and applications with either a central management program or individual applications on a vehicle's computing device.

Most mobile devices use a cable, docking unit, or cradle to communicate with a computer, usually through a USB port. Applications on the device can transfer and receive data from applications on the computer so that both the computer and the device have the same information. For example, Date Book software on a Palm device can communicate and exchange appointments with a Microsoft Outlook Calendar on a Windows computer. Wireless devices can synchronize over the Internet or wireless networks. Wireless sync eliminates the need for the device to be physically connected to the computer.

In this example it will be assumed that the central computing device is the ECU 20. Synchronizing cell phones to a vehicle's computing device for communication purposes is well known in the art and will not be discussed further herein in the interest of simplicity and clarity. An elapsed time clock is also started at process 110.

At decision point 120, the ECU 20 determines whether there is a cell phone 60 present (i.e., plugged in) and charging at an APO 50A/B. This may be accomplished in a variety of ways too numerous to chronicle herein. However, one exemplary method would include the wireless communication of a "charging" flag being set in the cell phone's software. This software may be included in an "app" (i.e. an application) that is installed on the cell phone by a user or may be part of the cell phone's operating system. In any event, the indication of "charging" is communicated to the ECU 20 wirelessly.

Determining whether there is a cell phone 60 present (i.e., plugged in) and charging at an APO 50A/B may be done continuously or discontinuously. Discontinuous monitoring is contemplated herein as being periodic or non-periodic and includes randomly, variably and/or a following fixed timing pattern that is not periodic.

In alternative embodiments, the indication of "charging" may be sent digitally to the ECU 20 via the DC Bus 40 as a wired communication. Communication of digital data over a power line such as a connected indication is well known in the art (e.g., I phone™) and will not be discussed herein in the interest of clarity and brevity.

In other embodiments, the indication of "charging" may include a communication of a state of charge (SOC) or a change in the SOC (ΔSOC). State of charge (SOC) is the equivalent of a fuel gauge for a conventional battery or a battery pack in an electric vehicle (BEV), hybrid vehicle (HEV), or plug-in hybrid electric vehicle (PHEV). The units of SOC are percentage points (0%=empty; 100%=full). An alternate form of the same measure is the depth of discharge (DoD), the inverse of SOC (100%=empty; 0%=full). SOC is normally used when discussing the current state of a battery in use, while DoD is most often seen when discussing the lifetime of the battery after repeated use.

Another indication of charging may be a detection of a trickle current through a particular distribution line 40A/B. Means for detecting a current through a wire are well known in the art. For example, a sensing resistor 41A/41B may be placed in the distribution line 40A/B.

When it is determined that the cellphone 60 is either not present or is not charging (i.e., battery is full) the ECU 20 shuts down power to the APO at process 150. This may be done by selectively opening a relay in the distribution line to the APO with the cell phone 60 or the ECU may shut down power to all APOs.

At decision point 130, the ECU 20 determines whether or not the SOC of the cell phone battery is below a predetermined threshold. Such a determination may be made by receiving an indication of the SOC from the cell phone via the wireless transceiver or via wired communication. The indication may be any suitable indication known in the art. Non-limiting examples of indications include a minimum voltage, an amp-hour calculation result, and a number of "bars" as is commonly shown on a cell phone. The predetermined threshold may be set at manufacture or maybe configured by a user.

When the SOC is less than the predetermined threshold, then the respective APO(s) are energized until the threshold is determined to have been met at process 140, wherein the APO(s) are subsequently deenergized at process 150.

At process 160, an elapsed time is checked since the last determination was made at process 110. If the elapsed time has passed then the method 100 returns to process 110 and the method 100 is repeated. The elapsed time may be set at manufacture or may be configured by a user.

When the SOC is at or greater than the predetermined threshold, then an elapsed time is checked on the timer since the last determination at process 110, at process 160. If the elapsed time has passed then the method 100 returns to process 110 and the method 100 is repeated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. A method for controlling an accessory power outlet by a computing device in a vehicle while charging a battery powered device, the vehicle having an electrical bus, a battery, and an accessory power outlet, wherein the accessory power outlet receives power from the battery and charges the battery powered device using the power supplied by the battery, the method comprising:
synchronizing communications between the battery powered device and the computing device of the vehicle;
determining, via an electronic control unit (ECU) of the vehicle, when the battery powered device is connected to the electrical bus and is charging; and
when the battery powered device is not connected to the electrical bus or the battery powered device is not charging, terminating the supply of power provided from the battery to the accessory power outlet, via the ECU.

2. The method of claim 1, wherein the determining when the battery powered device is connected to the electrical bus and the charging is performed discontinuously.

3. The method of claim 1, wherein determining when the battery powered device is charging is selected from a group of conditions consisting of receiving data from the battery powered device that charging flag has been set, detecting a trickle current to the battery powered device, and receiving digital data from the battery powered device indicating a positive change in a state of charge of the battery powered device.

4. The method of claim 1, further comprising:
determining whether the battery powered device has a state of charge that is less than a predetermined threshold; and
when the state of charge of the battery powered device is less than the predetermined threshold, energizing the accessory power outlet until the state of charge is greater than or equal to the predetermined threshold by providing power from the battery to the accessory power outlet, then de-energizing the accessory power outlet by terminating the supply of power provided from the battery to the accessory power outlet, via the ECU.

5. The method of claim 1, further comprising:
determining whether the battery powered device has a state of charge that is greater than or equal to a predetermined threshold; and
when the state of charge of the battery powered device is greater than or equal to the predetermined threshold, de-energizing the accessory power outlet by terminating the supply of power provided from the battery to the accessory power outlet, via the ECU.

6. The method of claim 4, further comprising:
determining an elapsed time since the battery powered device was connected to the accessory power outlet; and
when the elapsed time meets a predetermined threshold, determining when the battery powered device is connected to the electrical bus and is charging.

7. The method of claim 6, wherein one or both of the predetermined elapsed time and the threshold is configured by a user.

8. The method of claim 5, further comprising:
determining an elapsed time since the battery powered device was connected to the accessory power outlet; and
when the elapsed time meets a predetermine threshold then determine when the battery powered device is connected to the electrical bus and is charging.

9. The method of claim 1, wherein:
the vehicle includes a plurality of accessory power outlets, including the accessory power outlet that charges the battery powered device along with one or more additional accessory power outlets, each of the plurality of accessory power outlets configured to receive power from the battery; and
the step of terminating the supply of power comprises:
when the battery powered device is not connected to the electrical bus or the battery powered device is not charging, terminating the supply of power provided from the battery to each of the plurality of accessory power outlets of the vehicle.

10. The method of claim 1, wherein:
the battery supplies power to the accessory power outlet via a distribution line between the battery and the accessory power module; and
the step of terminating the supply of power comprises:
when the battery powered device is not connected to the electrical bus or the battery powered device is not charging, opening a relay in the distribution line.

11. A system for controlling an accessory power outlet (APO) in a vehicle while charging a battery powered device comprising:
a battery;
an electrical bus electrically connected to the battery;
at least one auxiliary power outlet in electrical communication with the battery and configured to mate with a battery charging port of a battery powered device, wherein the accessory power outlet receives power from the battery and charges the battery powered device using the power supplied by the battery; and
an electronic control unit (ECU), the ECU being configured to:
synchronize communications between the battery powered device and the ECU;
determine when the battery powered device is connected to the electrical bus and is charging; and
when the battery powered device is either not connected to the electrical bus or the battery powered device is not charging, terminate the supply of power provided from the battery to the accessory power outlet.

12. The system of claim 11, wherein the ECE is configured to determine when the battery powered device is charging based at least in part on one or more of receiving data from the battery powered device that a charging flag has been set, detecting a trickle current to the battery powered device, and receiving data from the battery powered device indicating a positive change in a state of charge of the battery powered device.

13. The system of claim 11, wherein the ECU is further configured to:
determine whether the battery powered device has a state of charge that is less than a predetermined threshold; and
when the state of charge of the battery powered device is less than the predetermined threshold, energize the accessory power outlet by allowing power to be provided from the battery to the accessory power outlet until the state of charge is greater or equal to the predetermined threshold, and de-energize the accessory power outlet by terminating the supply of power provided from the battery to the accessory power outlet.

14. The system of claim 11, wherein the ECU is further configured to:
determine whether the battery powered device has a state of charge that is greater than or equal to a predetermined threshold; and
when the state of charge of the battery powered device is greater than or equal to the predetermined threshold, de-energize the accessory power outlet by terminating the supply of power provided from the battery to the accessory power outlet.

15. The system of claim 13, wherein the ECU is further configured to:
determine an elapsed time since the battery powered device was connected to the accessory power outlet; and
when the elapsed time meets a predetermine threshold then determine when the battery powered device is connected to the electrical bus and is charging.

16. The system of claim 14, wherein the ECU is further configured to:
determine an elapsed time since the battery powered device was connected to the accessory power outlet; and
when the elapsed time meets a predetermine threshold then determine when the battery powered device is connected to the electrical bus and is charging.

17. A vehicle comprising:
a battery,
an electrical bus electrically connected to the battery;
at least one auxiliary power outlet in electrical communication with the battery via the electrical bus and configured to mate with a battery charging port of a battery powered device, wherein the accessory power outlet receives power from the battery and charges the battery powered device using the power supplied by the battery; and
an electronic control unit (ECU), the ECU being configured to:
synchronize communications between the battery powered device and the ECU;
determine when the battery powered device is connected to the electrical bus and is charging; and
when the battery powered device is either not connected to the electrical bus or the battery powered device is not charging, deenergize the accessory power outlet by terminating the supply of power provided from the battery to the accessory power outlet.

18. The vehicle of claim 17, further comprising a transceiver operable to communicate wirelessly with the battery powered device.

19. The vehicle of claim 17, wherein the battery powered device and the ECU communicate via the electrical bus.

20. The vehicle of claim 17, wherein:
- the ECU further determines a status of charge of the battery powered device; and
- when the status of charge of the battery powered device is below a predefined value then at least one auxiliary power outlet is energized by the ECU allowing power to be provided from the battery to the accessory power outlet.

\* \* \* \* \*